3,454,098
ARRANGEMENT IN SEA-GOING VESSELS POWERED WITH TWO COUNTER-ROTATING PROPELLERS
Oscar Hilding Hillander, Malmo, and Ingvar Karl Einar Jung, Finspong, Sweden, assignors to Stal-Laval Turbin AB, Finspong, Sweden
Filed Oct. 27, 1966, Ser. No. 589,950
Claims priority, application Sweden, Dec. 15, 1965, 16,285/65
Int. Cl. B63h 5/10; F16h 1/22
U.S. Cl. 170—135.28                2 Claims

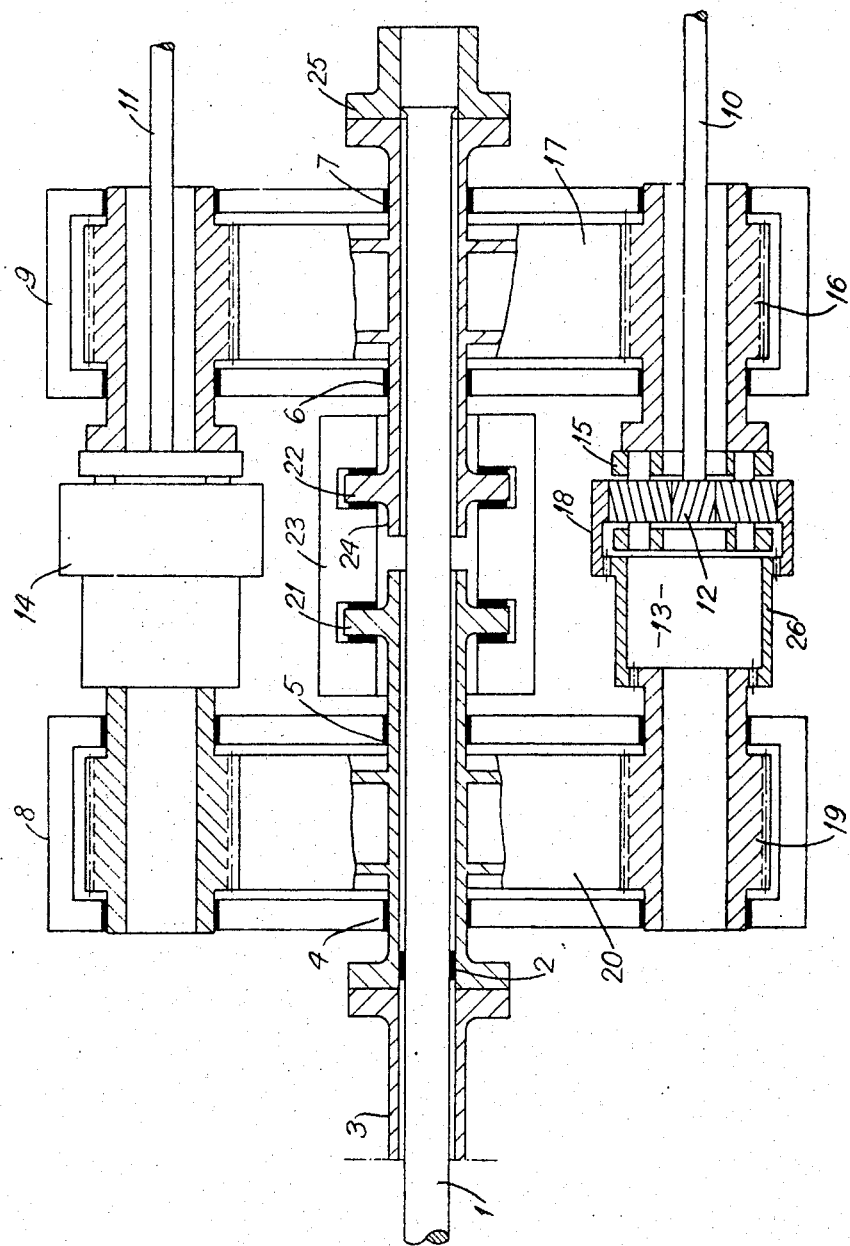

ABSTRACT OF THE DISCLOSURE

Bearing arrangement for propeller-driven craft having two coaxial propeller shafts the outer shaft being tubular with the inner shaft located therein, each of the shafts being driven separately by gearing units arranged in parallel spaced relationship, the thrust bearing for the outer shaft and the thrust bearing for the inner shaft both being located at a point between the gearing units.

---

This invention relates to improvements in propeller mechanisms and more particularly to an arrangement intended for use on sea-going vessels, and one of the objects of the invention is to provide a propeller shaft arrangement having numerous advantages as hereinafter set forth.

In the improved construction, there is provided two coaxially situated propeller shafts each of which is driven by parallel gears and with one of the propeller shafts located within the other, the outermost shaft of the pair being hollow or tubular in shape and concentrically receiving the inner shaft within it. The invention is mainly characterized by the use of two thrust bearings, one for each propeller shaft and which bearings are combined into a single unit, located between the two parallel gears for absorbing the axial forces of the propellers. A certain clearance is present between the parallel gears in order to provide a place for the drive arrangement such as planetary gears for the pinion of the parallel gears. By the utilization of this space for the thrust bearings and the housing therefor, it becomes unnecessary to arrange for extra space for said bearings. Due to the fact that the bearings are situated adjacent to each other, they can be provided with a common housing. This is economically advantageous, it permits easier alignment, offers greater stability, allows fewer oil seals to be used and reduces the oil leakage.

With these and other objects to be hereinafter set in view, we have devised the arrangement of parts stated below and more particularly pointed out in the claims appended hereto.

In the accompanying drawing, wherein an illustrative embodiment of the invention is disclosed:

The figure shown is a sectional view taken axially through the gears and thrust bearings.

Referring to the drawing, 1 indicates an inner propeller shaft that is journalled in a bearing 2 located within an outer tubular propeller shaft 3 that is journalled in bearings 4 and 5. Each of the said shafts 1 and 3 supports a propeller (not shown) and is driven by means of parallel gears 8 and 9. The reference numerals 10 and 11 indicate shafts leading from power units (not shown). Each of the shafts 10 and 11 is connected to a sun gear 12 in a planetary gear arrangement 13 and 14, the planetary carrier 15 of which is connected to a pinion 16 engaging a gear 17 of one of the parallel gears, while the inner toothed ring 18 of the planetary gear is in engagement with a gear 20 of the other parallel gear.

Located in the space between the parallel gears and the planetary gears is a thrust bearing 21 for the outer shaft 3 and also a thrust bearing 22 for the shaft 1. Both of the thrust bearings are contained within a single or unitary housing 23 which is located in the spacing between the gears 8 and 9. These bearings are operative to absorb the axial forces of the two propellers.

The bearing 22, which is the front bearing, is attached to a tubular shaft portion 24, supporting the gear wheel 17 and which is connected to the shaft 1 by means of a coupling 25 on the forward side of the parallel gear 9. The shaft 24 is journalled in the bearings 6 and 7.

The reference numeral 26 indicates a resilient member in the form of a gear coupling between the planetary gear and drive.

By means of the construction described, it will be seen that the spacing between the parallel gears is utilized to advantage by the thrust bearings 21 and 22 so that the provision of extra spaces for these useful and important bearings is unnecessary. The close proximity of one of these bearings to the other enables them to be enclosed in one common housing or that shown at 23. This results in an economical construction; it permits easier alignment and requires fewer oil seals; reduces oil leakage and has numerous other advantages readily apparent to those skilled in this art.

Having thus described a single embodiment of the invention, it is obvious that the same is not to be restricted thereto, but is broad enough to cover all structures coming within the scope of the annexed claims.

We claim:

1. Bearing arrangement for propeller-driven craft having two coaxially extending shafts, the outer one of said shafts being tubular within which the inner shaft is located,
    a gearing unit for driving each of said shafts separately,
    said gearing units being arranged in parallel spaced relationship and each of said gearing units including a gear wheel carried by each of said shafts,
    the tubular shaft terminating at a location between said gear wheels of said gearing units,
    a thrust bearing for the outer shaft located adjacent the end thereof,
    a thrust bearing for the inner shaft located at a spaced distance from the first thrust bearing at a location between said gear wheels of gearing units and a housing common to both of said thrust bearings.

2. Bearing arrangement according to claim 1 wherein the portion of the inner shaft extending beyond the outer shaft is provided with a tubular shaft connected to said inner shaft, the thrust bearing for said inner shaft and the gear wheel for driving said inner shaft being carried by said tubular shaft.

References Cited

UNITED STATES PATENTS

| 2,244,763 | 6/1941 | Bugatti | 170—135.28 X |
| 2,305,454 | 12/1942 | Nallinger et al. | 170—135.28 X |
| 2,826,255 | 3/1958 | Peterson | 170—135.75 |
| 3,196,714 | 7/1965 | Lundström. | |

FOREIGN PATENTS

| 919,435 | 11/1946 | France. |
| 896,459 | 11/1953 | Germany. |
| 897,803 | 11/1953 | Germany. |

EVERETTE A. POWELL, Jr., *Primary Examiner.*

U.S. Cl. X.R.

74—665; 170—135.75